United States Patent
Bohling et al.

(10) Patent No.: US 9,464,205 B2
(45) Date of Patent: Oct. 11, 2016

(54) PIGMENTED COATING COMPOSITION WITH ITACONIC ACID FUNCTIONALIZED BINDER

(71) Applicant: Rohm and Haas Company, Philadelphia, PA (US)

(72) Inventors: James C. Bohling, Lansdale, PA (US); Kevin J. Henderson, Phoenixville, PA (US)

(73) Assignee: Rohym and Haas Company, Philadelphia, PA (US)

( * ) Notice: Subject to any disclaimer, the term of this patent is extended or adjusted under 35 U.S.C. 154(b) by 0 days.

(21) Appl. No.: 14/565,914

(22) Filed: Dec. 10, 2014

(65) Prior Publication Data
US 2015/0175838 A1   Jun. 25, 2015

Related U.S. Application Data

(60) Provisional application No. 61/918,707, filed on Dec. 20, 2013.

(51) Int. Cl.
| C09D 135/02 | (2006.01) |
| C09D 4/00 | (2006.01) |
| C09D 5/00 | (2006.01) |
| C09D 133/14 | (2006.01) |

(52) U.S. Cl.
CPC ............ *C09D 135/02* (2013.01); *C09D 4/00* (2013.01); *C09D 5/00* (2013.01); *C09D 133/14* (2013.01)

(58) Field of Classification Search
CPC .................................................. C09D 135/02
See application file for complete search history.

(56) References Cited

U.S. PATENT DOCUMENTS

| 8,546,467 B2 | 10/2013 | Bohling et al. |
| 2003/0018103 A1 | 1/2003 | Bardman et al. |
| 2004/0054063 A1 | 3/2004 | Brown et al. |
| 2008/0146724 A1 | 6/2008 | Bohling et al. |
| 2009/0123742 A1* | 5/2009 | Vandermeulen ...... C08F 226/06 428/339 |
| 2012/0058278 A1 | 3/2012 | Bohling et al. |
| 2013/0096250 A1 | 4/2013 | Bohling et al. |

FOREIGN PATENT DOCUMENTS

| WO | 2008119887 A1 | 10/2008 |
| WO | 2013096162 A1 | 6/2013 |
| WO | 2013163808 A1 | 11/2013 |

\* cited by examiner

*Primary Examiner* — Robert Harlan
(74) *Attorney, Agent, or Firm* — Reid Willis

(57) ABSTRACT

The present invention is a composition comprising a) a stable aqueous dispersion of polymer particles functionalized with structural units of itaconic acid or a salt thereof and; b) a water-soluble polymer functionalized with structural units of a sulfonic acid monomer or a salt thereof as well as a method comprising mixing the stable aqueous dispersion of the itaconic acid functionalized polymer particles with the sulfonic acid functionalized polymer, and $TiO_2$. The composition of the present invention is useful a coatings formulation that provides surprisingly good hiding.

7 Claims, No Drawings

PIGMENTED COATING COMPOSITION WITH ITACONIC ACID FUNCTIONALIZED BINDER

BACKGROUND OF THE INVENTION

The present invention relates to improving hiding efficiency in pigmented paints using an itaconic acid functionalized latex binder in combination with a solution of a polymer containing sulfonic acid groups or salts thereof. The efficacy of the $TiO_2$ as a hiding pigment is reduced when $TiO_2$ particles are allowed to come too close together on film formation and drying. It is known that the spacing of $TiO_2$ and its concomitant hiding efficiency can be improved with the aid of emulsion polymers particles adsorbed to the $TiO_2$ particle surface, as disclosed in US 2003/0018103. One of the problems observed with current adsorbing latex technology, particularly latexes prepared using highly reactive functional monomers such as phosphoethylmethacrylate (PEM), is formation of grit arising from the uncontrolled reaction of the reactive adsorbing latex with $TiO_2$. To control grit, the formulator must carefully mix the adsorbing latex with the pigment under controlled conditions to avoid flocculation, which often requires expensive high shear mixing.

Alternatively, grit can be controlled using less reactive adsorbing latexes, for example, latexes prepared from less reactive functional monomers such as itaconic acid (IA). These less reactive functional monomers may also provide a lower cost alternative and improvements in film properties, such as water sensitivity or scrub resistance. Coatings formulations made from these latexes, however, exhibit significantly less hiding than coatings made from the more reactive latexes. U.S. Pat. No. 8,546,467 discloses a process of manipulating the pH within an adsorbing latex prepared with a less reactive monomer (IA) to give reduced grit and better hiding within a paint formulation. This process, while representing an advance in hiding technology, introduces an additional step to the formulator that may lead to a drop in volume solids and an increase in dissolved salts upon neutralizing back to a typical paint pH; such additional steps tend to adversely affect the cost and performance of formulated paints. It would therefore be desirable to discover a simpler way to improve the hiding efficiency of coatings formulated with itaconic acid functionalized binders.

SUMMARY OF THE INVENTION

In a first aspect, the present invention addresses a need in the art by providing a process for preparing a coatings composition comprising the steps of contacting: a) an aqueous solution of a water-soluble polymer functionalized with structural units of a sulfonic acid monomer or a salt thereof; b) a stable aqueous dispersion of polymer particles functionalized with structural units of itaconic acid or a salt thereof; and c) $TiO_2$;
wherein the weight percent of the sulfonic acid functionalized polymer is from 0.1 to 10 percent, based on the weights of the sulfonic acid functionalized and the itaconic acid functionalized polymer particles;
wherein the weight percent of the itaconic acid functionalized polymer particles is from 20 to 80%, based on the weight of the sulfonic acid functionalized and the itaconic acid functionalized polymer particles, and the $TiO_2$;
wherein the weight percent of the $TiO_2$ is from 20 to 80% based on the weight of the sulfonic acid functionalized polymer, the itaconic acid functionalized polymer particles, and the $TiO_2$; and
wherein the weight percent of structural units of itaconic acid or a salt thereof is from 0.1 to 5 weight percent, based on the weight of the itaconic acid functionalized polymer particles.

In a second aspect, the present invention is a composition comprising a) a stable aqueous dispersion of polymer particles functionalized with structural units of itaconic acid or a salt thereof and; b) a water-soluble polymer functionalized with structural units of a sulfonic acid monomer or a salt thereof; wherein the weight percent of the sulfonic acid functionalized polymer is from 0.1 to 10 percent, based on the weights of the itaconic acid functionalized polymer particles and sulfonic acid functionalized polymer; and the weight percent of the itaconic acid functionalized polymer particles is from 90 to 99.9 weight percent; wherein the weight percent of structural units of itaconic acid or a salt thereof is from 0.1 to 5 weight percent, based on the weight of the itaconic acid functionalized polymer particles.

The present invention provides a way of improving hiding in paint formulations with a binder functionalized with itaconic acid, which is not traditionally regarded as a particularly effective adsorbing binder.

DETAILED DESCRIPTION OF THE INVENTION

In a first aspect, the present invention is process for preparing a coatings composition comprising the steps of contacting: a) an aqueous solution of a water-soluble polymer functionalized with structural units of a sulfonic acid monomer or a salt thereof; b) a stable aqueous dispersion of polymer particles functionalized with structural units of itaconic acid or a salt thereof; and c) $TiO_2$;
wherein the weight percent of the sulfonic acid functionalized polymer is from 0.1 to 10 percent, based on the weights of the sulfonic acid functionalized and the itaconic acid functionalized polymer particles;
wherein the weight percent of the itaconic acid functionalized polymer particles is from 20 to 80%, based on the weight of the sulfonic acid functionalized and the itaconic acid functionalized polymer particles, and the $TiO_2$;
wherein the weight percent of the $TiO_2$ is from 20 to 80% based on the weight of the sulfonic acid functionalized polymer, the itaconic acid functionalized polymer particles, and the $TiO_2$; and
wherein the weight percent of structural units of itaconic acid or a salt thereof is from 0.1 to 5 weight percent, based on the weight of the itaconic acid functionalized polymer particles.

As used herein, the term "structural units" refers to the groups formed upon the polymerization of the recited monomer. A structural unit of itaconic acid is illustrated:

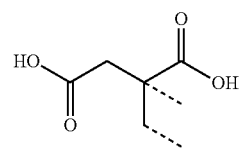

wherein the dotted lines represent the points of connectivity to the polymer backbone.

The polymer functionalized with structural units of a sulfonic acid monomer or a salt thereof (the sulfonic acid functionalized polymer) is a water-soluble polymer that may be a homopolymer or a copolymer and preferably comprises at least 20, and more preferably at least 50 weight percent, to 100, more preferably to 95, more preferably to 80 weight percent structural units of a sulfonic acid monomer or a salt thereof, based on the weight of the sulfonic acid functionalized monomer. Examples of suitable sulfonic acid monomers include 2-acrylamido-2-methylpropane sulfonic acid, vinyl sulfonic acid, 2-sulfoethyl acrylate, 2-sulfoethyl methacrylate, 3-sulfopropyl acrylate, 3-sulfopropyl methacrylate, sodium styrene sulfonate, and 2-propene-1-sulfonic acid, and salts thereof, and combinations thereof. A particularly preferred sulfonic acid monomer is 2-acrylamido-2-methylpropane sulfonic acid (AMPS) or a salt thereof.

The sulfonic acid functionalized polymer may further comprise structural units of another monomer, examples of which include acrylates and methacrylates such as methyl methacrylate, ethyl acrylate, butyl acrylate, ethyl hexyl acrylate, hydroxyethyl methacrylate and hydroxypropyl acrylates; dialkylaminoalkyl acrylates and methacrylates including 2-(N,N-dimethylamino)ethyl methacrylate (DMAEMA), 2-(N,N-dimethylamino)ethyl acrylate, 2-(N, N-diethylamino)ethyl methacrylate, 2-(N,N-diethylamino) ethyl acrylate 2-(t-butylamino) ethyl methacrylate, 3-(dimethylamino)propyl acrylate, 2-diisopropylaminoethyl methacrylate, and 3-dimethylaminoneopentyl acrylate; polyalkylene glycol acrylates and methacrylates including poly(ethylene glycol) methacrylate, poly(ethylene glycol) acrylate, and lauryl-O—(CH$_2$CH$_2$O)$_{23}$-methacrylate; dialkylaminoalkyl acrylamides and methacrylamides including N-[2(N,N-dimethylaminoethyl]methacrylamide, N-[3-(N,N-dimethylamino)propyl]acrylamide, and N-[3-(N, N-dimethylamino)propyl]methacrylamide; acrylamidotrialkylammonium halides including [2-(acryloxy)ethyl]trimethylammonium chloride, [2-(methacryloxy)ethyl] trimethylammonium chloride, and (3-methacrylamidopropyl)trimethylammonium chloride.

An example of a preferred sulfonic acid functionalized polymer comprises from 5 weight percent, to 80, more preferably to 50 weight percent structural units of another monomer such as 2-hydroxylpropyl acrylate, methyl methacrylate, or DMAEMA.

While it is permissible for the sulfonic acid functionalized polymer to comprise structural units of methacrylic acid or acrylic acid, it is preferred that this polymer comprise less than 5.0, more preferably less than 1, and most preferably less than 0.1 weight percent of these monocarboxylic acid functionalized monomers.

The sulfonic acid functionalized polymer preferably has a weight average molecular weight (M$_w$) in the range of 1000 to 25,000 Daltons. Preferably, the weight percent of the sulfonic acid functionalized polymer is from 0.4 weight percent to 8, more preferably to 4 weight percent, based on the weight of the sulfonic acid functionalized polymer and the itaconic acid functionalized polymer particles.

The stable aqueous dispersion of polymer particles functionalized with structural units of itaconic acid or a salt thereof (itaconic acid functionalized polymer particles) are preferably acrylic, styrene-acrylic, or vinyl ester-acrylic (more particularly vinyl acetate-acrylic) latex binders, and the polymer particles preferably further comprise structural units of one or more of the following monomers: methyl methacrylate, butyl acrylate, ethyl acrylate, 2-ethylhexyl acrylate, ureido methacrylate, styrene, vinyl acetate, and vinyl versatate. The itaconic acid functionalized polymer may also include structural units of other monomers such as allyl methacrylate, divinyl benzene, acrylamide, and acetoacetoxyethyl methacrylate.

The weight percent of itaconic acid is preferably from 0.5 to 4 weight percent, based on the weight of the itaconic acid functionalized polymer particles.

The TiO$_2$ is preferably provided as an aqueous slurry stabilized by a pigment dispersant such as a homopolymer and a copolymer of an acid functionalized monomer, such as a carboxylic acid functionalized monomer including acrylic acid, methacrylic acid, and maleic acid, or combinations thereof. Commercial examples of pigment dispersants include TAMOL™ 945 Dispersant, TAMOL™ 1124 Dispersant, and TAMOL™ 731A Dispersant. (TAMOL is a Trademark of The Dow Chemical Company or its Affiliates).

In a second aspect, the present invention is a composition comprising a) a stable aqueous dispersion of polymer particles functionalized with structural units of itaconic acid or a salt thereof and; b) a water-soluble polymer functionalized with structural units of a sulfonic acid monomer or a salt thereof; wherein the weight percent of the sulfonic acid functionalized polymer is from 0.1 to 10 percent, based on the weights of the itaconic acid functionalized polymer particles and sulfonic acid functionalized polymer; and the weight percent of the itaconic acid functionalized polymer particles is from 90 to 99.9 weight percent; wherein the weight percent of structural units of itaconic acid or a salt thereof is from 0.1 to 5 weight percent, based on the weight of the itaconic acid functionalized polymer particles.

The composition may further include from 20 to 80 weight percent TiO$_2$ based on the weight of the itaconic acid functionalized polymer particles and the water-soluble polymer. Though not bound by theory, it is believed that the water-soluble polymer ultimately promotes adsorption of itaconic acid functionalized polymer particles onto the TiO$_2$ particles.

The coatings composition further includes one or more of the following materials: rheology modifiers; opaque polymers; fillers; colorants, other pigments including encapsulated or partially encapsulated pigments and opaque pigments; dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

EXAMPLES

Abbreviations

Itaconic Acid IA
2-Acrylamido-2-methylpropane sulfonic acid AMPS
2-Hydroxypropyl Acrylate HPA
n-Butyl Acrylate BA
Methyl Methacrylate MMA
Ureido Methacrylate UMA
Acrylic Acid AA
Methacrylic Acid MAA
Ammonium Persulfate APS
t-Butyl Hydroperoxide t-BHP
Isoascorbic Acid IAA
Ethylenediaminetetraacetic acid, tetrasodium salt EDTA In the following examples, ACRYSOL™, TERGITOL™, and TAMOL™ are all Trademarks of The Dow Chemical Company or Its Affiliates.

Example 1

Paint Formulation from IA Binder with Added AMPS-HPA

A. Preparation of 2% IA Binder:
A stage 1 monomer emulsion (ME1) was prepared by mixing DI water (346.0 g), sodium laureth sulfate (36.0 g, 31% active), BA (689.8 g), MMA (484.1 g), and UMA (24.6 g of a 50% aqueous solution). A stage 2 monomer emulsion (ME2) was prepared by mixing DI water (200.0 g), sodium laureth sulfate (21.5 g, 31% active), BA (370.35 g), MMA (292.05 g), and UMA (13.25 g of a 50% aqueous solution).

DI water (800.0 g), sodium laureth sulfate (3.50 g, 31% active) and IA (37.9 g) were added to a 5-L, four-necked round bottom flask equipped with a paddle stirrer, a thermocouple, a nitrogen inlet, and a reflux condenser, and stirring was initiated. The contents of the flask were heated to 80° C. under nitrogen. A portion of the stage 1 monomer emulsion (47.5 g) was added to the kettle followed by a DI water rinse (30 g). The contents were stirred for 1 min, after which time a solution of APS (0.45 g) in DI water (10 g) was added, followed by addition of a solution of Bruggolite FF6 M organic sulfinic acid sodium salt derivative (0.45 g) in DI water (10 g), and then a solution of iron sulfate heptahydrate (0.02 g) and EDTA (0.013 g) in DI water (22.3 g). After another 3 min, ME1 was added to the flask over 64 min. Solutions of APS (1.65 g) and t-BHP (1.90 g) in DI water (101.5 g) and Bruggolite FF6 M organic sulfinic acid sodium salt derivative (2.20 g) in DI water (103.5 g) were fed concurrently and separately to the flask at a rate of 1.0 g/min After completion of ME1 feed, DI water (25 g) was added as a rinse. ME2 was then added to the flask over 30 min. After completion of the ME2 feed, DI water (25 g) was added as a rinse. The contents of the flask were maintained at 79-81° C. during the additions. The batch was then cooled to 30° C. while a redox pair was added to the kettle to reduce residual monomer level. After the redox pair addition, an aqueous solution of ammonia (23.8 g, 28% aqueous) was added at a temperature less than 40° C., followed by addition of a biocide. The particle size was found to be 151 nm, the solids content was 50.6%, and pH 8.2.

B. Grind Preparation:

TAMOL™ 1124 Dispersant (0.35 g) and water (9.38 g) were combined in a 60-MAX Speed Mixer cup, followed by the addition of Ti Pure R-706 $TiO_2$ (43.65 g) and mixed in a Speed Mixer for 2 min at 2200 rpm, followed by the addition of water (6.61 g) and additional mixing for 1 min.

C. Paint Formulation:

A water-soluble sulfonic acid functionalized polymer (63% AMPS/35% HPA/2% AA by weight, 4.84 g, 31% solids, $M_w$=5900 g/mol; $M_n$=1500 g/mol, hereinafter AMPS-HPA) and DI water (0.59 g) were added to IA binder (48.98 g) in a pint-sized plastic container with mixing at ~350 rpm; grind (51.58 g) was then added and mixing was continued 10 min. Following this initial mixing, additional IA binder (61.20 g), Texanol coalescent (4.46 g), ACRYSOL™ RM-2020 NPR Rheology Modifier (4.49 g), ACRYSOL™ RM-825 Rheology Modifier (0.24 g), TERGITOL™ 15-S-9 Surfactant (0.80 g), and water (24.14 g) were added and stirring was continued for an additional 10 min at 1200 rpm.

Comparative Example 1

Paint Formulation from 2% IA Binder with Added TAMOL™ 1124 Dispersant

A. Preparation of 2% IA Binder:
The binder was prepared as described in Example 1 A.
B. Grind Preparation:
The grind was prepared as described in Example 1B.
C. Paint Formulation:
TAMOL 1124 Dispersant (3.00 g) and DI water (2.43 g) were added to IA binder (48.98 g) in a pint-sized plastic container with mixing at 350 rpm; grind (51.58 g) was then added and mixing was continued for 10 min. Following this initial mixing, IA binder (61.20 g), Texanol coalescent (4.46 g), ACRYSOL™ RM-2020 NPR Rheology Modifier (4.49 g), ACRYSOL™ RM-825 Rheology Modifier (0.24 g), TERGITOL™ 15-S-9 Surfactant (0.80 g), and water (24.14 g) were added; stirring was continued for an additional 10 min at 1200 rpm.

Comparative Example 2

Paint Formulation from 2% IA Binder Only

A. Preparation of 2% IA Binder:
The binder was prepared as described in Example 1 A.
B. Grind Preparation:
The grind was prepared as described in Example 1B.
C. Paint Formulation:
DI water (5.43 g) was added to IA binder (48.98 g) in a pint-sized plastic container with mixing at ~350 rpm; grind (51.58 g) was added and mixing was continued for 10 min. Following this initial mixing, IA binder (61.20 g), Texanol coalescent (4.46 g), ACRYSOL™ RM-2020 NPR Rheology Modifier (4.49 g), ACRYSOL™ RM-825 Rheology Modifier (0.24 g), TERGITOL™ 15-S-9 Surfactant (0.80 g), and water (24.14 g) were added; stirring was continued for an additional 10 min at 1200 rpm.

Comparative Example 3

Paint Prepared from 2% MAA Binder with Added AMPS-HPA

A. Preparation of 2% MAA Binder:
BA (774 g), MMA (889 g), UMA (34 g of a 50% aqueous solution), and MAA (34.0 g) were combined with DI water (480 g), and sodium lauryl sulfate (21.6 g 28% active) and emulsified with stirring. Sodium carbonate (5.68 g), sodium lauryl sulfate (11.5 g 28% active), and DI water (820 g) were charged to a 5-L multi-neck flask fitted with mechanical stirring, followed by addition of 40-nm EA-MMA seed particles (144 g, 33.4% aqueous solution). The flask contents were heated to 87° C. under nitrogen and polymerization was initiated by the addition of APS (5.68 g) in DI water (10 g). Gradual addition of the monomer emulsion was subsequently commenced with a total addition time for the feeds of 60-70 min. APS (1.0 g) in DI water (80 g) was added along with the monomer emulsion during the course of the entire feed. Reactor temperature was maintained at approximately 88° C. throughout the polymerization. DI water (30 g) was used to rinse the emulsion feed line to the reactor. After completion of the monomer emulsion addition, the reactor was cooled to 70° C. Unreacted monomers were reduced through the addition of ferrous sulfate (10 ppm), 70% t-BHP (1 g) and IAA (0.5 g) in an aqueous solution. After the redox pair addition, an aqueous solution of ammonia (11.2 g, 28% aqueous) was added at a temperature less than 40° C., followed by addition of a biocide. The particle size was found to be 151 nm, the solids content 50.4%, and pH 8.7.
B. Grind Preparation:
The grind was prepared as described in Example 1B.
C. Paint Formulation:
The water-soluble sulfonic acid functionalized polymer (63% AMPS/35% HPA/2% AA by weight, 4.84 g, 31% solids, $M_w$=5900 g/mol; $M_n$=1500 g/mol) and DI water (0.39 g) were added to the MAA binder (48.18 g) in a pint-sized plastic container with mixing at ~350 rpm; grind (51.58 g) was then added and mixing was continued 10 min.

Following this initial mixing, MAA binder (61.44 g), Texanol coalescent (4.46 g), ACRYSOL™ RM-2020 NPR Rheology Modifier (4.49 g), ACRYSOL™ RM-825 Rheology Modifier (0.24 g), TERGITOL™ 15-S-9 Surfactant (0.80 g), and water (23.90) were added and stirring was continued for an additional 10 min at 1200 rpm.

Comparative Example 4

2% MAA Binder with No Sulfonic Acid Functionalized Polymer

A. Preparation of 2% MAA Binder:
Binder synthesis was carried out as described for Comparative Example 3.
B. Grind Preparation:
The grind was prepared as described in Example 1B.
C. Paint Formulation:
DI water (5.23 g) was added to MAA binder (49.18 g) in a pint-sized plastic container with mixing at ~350 rpm. Grind (51.58 g) was then added and mixing was continued 10 min. Following this initial mixing, MAA binder (61.44 g), Texanol coalescent (4.46 g), ACRYSOL™ RM-2020 NPR Rheology Modifier (4.49 g), ACRYSOL™ RM-825 Rheology Modifier (0.24 g), TERGITOL™ 15-S-9 Surfactant (0.80 g), and water (23.90) were added and stirring was continued for an additional 10 min at 1200 rpm.

Comparative Example 5

2% MAA Binder with Added TAMOL™ 1124 Dispersant

A. Preparation of 2% MAA Binder:
Binder synthesis was carried out as described for Comparative Example 3.
B. Grind Preparation:
The grind was prepared as described in Example 1B.
C. Paint Formulation:
TAMOL™ 1124 Dispersant (3.00 g) and DI water (2.23 g) were added to MAA binder (49.18 g) in a pint-sized plastic container with mixing at ~350 rpm; grind (51.58 g) was then added and mixing was continued 10 min. Following this initial mixing, MAA binder (61.44 g), Texanol coalescent (4.46 g), ACRYSOL™ RM-2020 NPR Rheology Modifier (4.49 g), ACRYSOL™ RM-825 Rheology Modifier (0.24 g), TERGITOL™ 15-S-9 Surfactant (0.80 g), and water (23.90) were added and stirring was continued for an additional 10 min at 1200 rpm.

Kubelka-Munk S/mil Test Method:
Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The Y-reflectance was measured using a BYK Gardner Spectro-guide 45/0 Gloss Color spectrophotometer in each of the scribed areas five times measuring on a diagonal starting at the top of the rectangle and the average Y-reflectance recorded. A thick film draw down was prepared for each paint on Black Vinyl Charts (Leneta Form P121-10N) using a 3" 25 mil block draw down bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1-R^2)} \times \ln\frac{1-(R_B \times R)}{1-\frac{R_B}{R}} \quad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in$^2$.

$$X(\text{mils}) = \frac{W_{pf}(\text{g}) \times 1000(\text{mil/in})}{D(\text{lbs/gal}) \times 1.964(\text{g/in}^3 / \text{lbs/gal}) \times A(\text{in})}$$

The hiding values for the formulated paints are shown in Table 1.

TABLE 1

Hiding Values for Paint Formulation

| Example No. | Description of Paint Formulation | S/mil |
|---|---|---|
| Example 1 | 2% IA binder with added AMPS-HPA | 6.89 |
| Comparative 1 | 2% IA binder with added Tamol 1124 | 6.16 |
| Comparative 2 | 2% IA binder with no added AMPS-HPA or Tamol 1124 | 6.16 |
| Comparative 3 | 2% MAA binder with added AMPS-HPA | 5.41 |
| Comparative 4 | 2% MAA binder with no added AMPS-HPA or Tamol 1124 | 5.39 |
| Comparative 5 | 2% MAA binder with added Tamol 1124 | 5.20 |

The baseline hiding for a paint made of 2% IA and no added AMPS-HPA or TAMOL™ 1124 Dispersant within the binder (Comparative 2) is 6.16 S/mil. The addition of TAMOL™ 1124 Dispersant to the binder in the first mixing stage (Comparative 1) gives the same hiding value, while the substitution of AMPS-HPA for the same amount as TAMOL™ 1124 Dispersant results in a 0.73 S/mil improvement (6.89 S/mil). When the IA binder is replaced by a similar binder containing MAA, the hiding is 5.39 S/mil when neither AMPS-HPA nor TAMOL™ 1124 Dispersant is added to the binder. Furthermore, addition of TAMOL™ 1124 Dispersant and AMPS-HPA to the MAA binder does not lead to any opacity improvements observed with the IA binder. Thus, while the results suggest that IA functionalization of the binder alone improves S/mil, the use of the water-soluble sulfonic acid functionalized polymer further contributes to an increase in hiding.

It has surprisingly been discovered that paints prepared using a combination of the itaconic acid functionalized binder, the sulfonic acid functionalized polymer, and TiO$_2$ show improved hiding over itaconic acid functionalized binders that do not include the water-soluble polymer or methacrylic acid functionalized binders that do.

The invention claimed is:
1. A composition comprising a) a stable aqueous dispersion of polymer particles functionalized with structural units of itaconic acid or a salt thereof and; b) a water-soluble polymer functionalized with structural units of a sulfonic acid monomer or a salt thereof; wherein the weight percent of the sulfonic acid functionalized polymer is from 0.1 to 10 percent, based on the weights of the itaconic acid functionalized polymer particles and sulfonic acid functionalized polymer; and the weight percent of the itaconic acid functionalized polymer particles is from 90 to 99.9 weight percent; wherein the weight percent of structural units of itaconic acid or a salt thereof is from 0.1 to 5 weight percent, based on the weight of the itaconic acid functionalized polymer particles.

2. The composition of claim 1 which further comprises from 20 to 80 weight percent $TiO_2$ based on the weight of the itaconic acid functionalized polymer particles, the water-soluble polymer, and the $TiO_2$.

3. The composition of claim 2 which further comprises one or more materials selected from the groups consisting of rheology modifiers; opaque polymers; fillers; colorants, other pigments including encapsulated or partially encapsulated pigments and opaque pigments; dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

4. A composition comprising
a) a stable aqueous dispersion of polymer particles functionalized with structural units of itaconic acid or a salt thereof;
b) a water-soluble polymer functionalized with structural units of a sulfonic acid monomer or a salt thereof; and
c) $TiO_2$;
wherein the weight percent of the sulfonic acid functionalized polymer is from 0.1 to 10 percent, based on the weights of the itaconic acid functionalized polymer particles and sulfonic acid functionalized polymer;
the weight percent of the itaconic acid functionalized polymer particles is from 90 to 99.9 weight percent based on the weights of the itaconic acid functionalized polymer particles and sulfonic acid functionalized polymer;
the weight percent of structural units of itaconic acid or a salt thereof is from 0.1 to 5 weight percent, based on the weight of the itaconic acid functionalized polymer particles; and
the weight percent of the $TiO_2$ particles is from 20 to 80 weight percent, based on the weight of the itaconic acid functionalized polymer particles, the water soluble polymer, and the $TiO_2$ particles.

5. The composition of claim 4 wherein the sulfonic acid functionalized polymer comprises structural units of 2-acrylamido-2-methylpropane sulfonic acid or a salt thereof.

6. The composition of claim 4 the sulfonic acid functionalized polymer further comprises from 5 to 50 weight percent structural units of 2-hydroxylpropyl acrylate, methyl methacrylate, or 2-(N,N-dimethylamino)ethyl methacrylate.

7. The composition of claim 4 which further comprises one or more materials selected from the groups consisting of rheology modifiers; opaque polymers; fillers; colorants, other pigments including encapsulated or partially encapsulated pigments and opaque pigments; dispersants; wetting aids; dispersing aids; dispersant adjuvants; surfactants; co-solvents; coalescing agents and plasticizers; defoamers; preservatives; anti-mar additives; flow agents; leveling agents; slip additives; and neutralizing agents.

\* \* \* \* \*